United States Patent [19]

Evers et al.

[11] 3,929,919

[45] Dec. 30, 1975

[54] PROCESS FOR PRODUCING ALKYLIDENE ALKENE HALIDES

[75] Inventors: William J. Evers, Red Bank; Howard H. Heinsohn, Jr., Hazlet; Bernard J. Mayers, Cliffwood Beach, all of N.J.

[73] Assignee: International Flavors & Fragrances Inc., New York, N.Y.

[22] Filed: July 30, 1973

[21] Appl. No.: 383,580

[52] U.S. Cl............ 260/654 R; 260/601 R; 260/633
[51] Int. Cl.² ............................................. C02C 21/04
[58] Field of Search ............ 260/601 R, 654 R, 655, 260/681, 653.3, 633

[56] References Cited
UNITED STATES PATENTS

| 1,094,223 | 4/1914 | Kyriakides | 260/681 |
|---|---|---|---|
| 2,921,940 | 1/1960 | Ramsden | 260/633 |
| 3,483,263 | 12/1969 | Schlichting et al. | 260/653.3 |

FOREIGN PATENTS OR APPLICATIONS

| 451,827 | 2/1913 | France | 260/681 |

OTHER PUBLICATIONS

*Grignard Reactions of Nonmetallic Substances*, Kharasch et al., pp. 196–197, Prentice–Hall, Inc., N.Y., (1954).

*Primary Examiner*—Delbert E. Gantz
*Assistant Examiner*—Joseph A. Boska
*Attorney, Agent, or Firm*—Harold Haidt, Esq.; Arthur L. Liberman, Esq.

[57] ABSTRACT

Processes for producing 2-alkylidene-3-alkenals which comprise (1) reacting an $\alpha,\beta$-unsaturated aldehyde with a halogen to form the $\alpha$-halo derivative thereof; (2) either (i) reacting the $\alpha$-halo derivative with a Grignard reagent, hydrolyzing the resulting product to form a hydroxyhaloalkene and then dehydrating the hydroxyhaloalkene to form an alkylidene trans alkene halide or (ii) reacting the said $\alpha$-halo derivative with a tri-substituted alkylidene phosphorane or alkylidene phosphorous triamide to form a mixture of alkylidene-trans-alkene halide and alkylidene-cis-alkene halide and, optionally, separating the isomers; (3) treating the said alkylidene alkene halide with an organometallic reagent or a metal in order to form an alkylidene alkene metallo compound; and (4) treating the said alkylidene alkene metallo compound with either a N,N-dialkyl formamide or a trialkyl orthoformate ester (followed by acid hydrolysis) thus yielding the 2-alkylidene-trans-3-alkenal and/or 2-alkylidene-cis-3-alkenal.

2 Claims, No Drawings

PROCESS FOR PRODUCING ALKYLIDENE ALKENE HALIDES

BACKGROUND OF THE INVENTION

The present invention relates to novel processes for producing 2-alkylidene-substituted-3-alkenals in a particular isomeric form or in a particular isomer ratio. (The term "isomer" refers to the "cis" isomer and the "trans" isomer with respect to the double bond in the alkene chain rather than in the alkylidene moiety).

U.S. Pat. No. 3,463,818 shows unsaturated aldehydes having various floral odors and processes for preparing such compounds. Japanese published application 72/43526 shows the synthesis of terpene derivatives having orange-like odors, and hexadienal derivatives are shown. Wiemann et al, *Memoires Presentes Soc. Chem.*, 1966 1760, describe nuclear magnetic residence studies on some conjugated dienals, and a number of these compounds, including 2-ethylidene-3-pentenal are shown. 2-Propenyl-3-pentenal is mentioned in *Chem. Abstracts* 35, 6238.

West German published application 1 951 883 is said in *Chem. Abstracts* 75, 5246 to show preparation of dienals useful as perfumes. Tiffeneau et al, *Comptes Rend.* 204, 590 shows the preparation of 2-alkylidene-3-butenals.

U.S. Pat. Nos. 3,272,873; 3,453,317; and 3,493,619 show processes for preparing unsaturated aldehydes or for treating such aldehydes. U.S. Pat. No. 3,520,936 shows production of an unsaturated aldehyde, and U.S. Pat. No. 3,542,878 shows an aldol condensation using a tin catalyst.

Odiger et al *Annalen* 682, 58; Corey et al, *J. Am. Chem. Soc.* 90, 6816; and Wittig et al, *Chem. Ber.* 94, 676 shows alkylidenylation reactions utilizing phosphorous compounds. Goldberg et al show selective reduction of unsaturated Schiff base systems in *J. Am. Chem. Soc.* 77, 1955.

The processes of the present invention provide straightforward methods for producing 2-alkylidene-3-alkenals in good yields either in particular ratios of 2-alkylidene-cis-3-alkenal to 2-alkylidene-trans-3-alkenal or as substantially all 2-alkylidene-cis-3-alkenal isomer or as substantially all 2-alkylidene-trans-3-alkenal isomer.

Briefly, the processes of our invention comprise the steps of (1) reacting an aliphatic α,β-unsaturated aldehyde with a halogen to provide the corresponding α-halo aldehyde derivative; (2) either (i) reacting the said α-halo aldehyde derivative with an alkyl magnesium halide Grignard reagent, hydrolyzing the resulting product to form a hydroxyhaloalkene, and dehydrating the resulting hydroxyhaloalkene to form an alkylidene trans alkene halide or (ii) reacting the said α-halo aldehyde derivative with a tri-substituted alkylidene phosphorane or an alkylidene phosphorous triamide to provide a mixture of alkylidene cis alkene halide and alkylidene trans alkene halide; (3) either (i) treating either the mixture of said alkylidene alkene halide isomers or said alkylidene trans alkene halide with a metal such as magnesium thereby forming an organo-metallic reagent and reacting the said organo-metallic reagent so formed with a trialkyl orthoformate (to yield an acetal which is then hydrolyzed with acid) to yield the desired alkylidene-trans-alkenal or (ii) reacting the mixture of alkylidene alkene halide isomers with an alkyl lithium to form a second organo-metallic reagent (mixture of isomers) and then reacting said organo-metallic reagent with a dialkyl formamide followed by acid hydrolysis forming a mixture of 2-alkylidene-3-cis-alkenal and alkylidene-3-trans-alkenal or (iii) physically separating the alkylidene cis-alkene halide from the alkylidene trans-alkene halide and then reacting each isomer independently with an alkyl lithium to form a second organo-metallic reagent and then reacting each of said second organo-metallic reagents with a dialkyl formamide, followed by acid hydrolysis forming, separately, an alkylidene-trans-alkenal and an alkylidene-cis-alkenal.

The 2-alkylidene-3-alkenals provided according to the processes disclosed are useful, among other things, for altering the organoleptic properties of consumable materials.

The 2-alkylidene-3-alkenal isomers produced herein substantially respond to the formula:

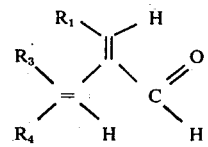

where $R_1$ is lower alkyl, and one of $R_3$ and $R_4$ is hydrogen and the other is lower alkyl. In the above-mentioned utility of the alkenals, the lower alkyl groups containing from one to four carbon atoms are desirable, and in certain preferred embodiments of the invention $R_1$ is methyl or ethyl, and $R_3$ or $R_4$ is methyl, ethyl, isopropyl, n-butyl and 2'-methyl propyl.

It will be understood from the present disclosure that several "cis-trans" isomers are possible as a result of the presence of alkyl substituents on the carbon atoms surrounding the carbon-carbon double bond of the "alkenal" chain (as opposed to the "alkylidene" moiety) and are contemplated herein. As an instance, a particularly preferred alkenal is 2-ethylidene-cis-3-hexenal, the compound according to the foregoing formula when $R_1$ is methyl, $R_3$ is ethyl, and $R_4$ is hydrogen. The structure of this compound can be written:

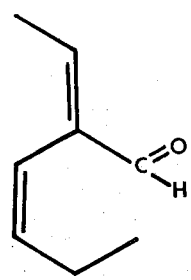

This configuration represents the one in which the methyl group represented by $R_1$ is trans to the carbonyl group and the ethyl group represented by $R_3$ is cis to the alkylidene group. The processes of our invention primarily cause production of compounds wherein the alkyl group represented by $R_1$ is in a position trans to the carbonyl group.

It will accordingly be understood by those skilled in the art from the present disclosure that the position of the $R_3$ and $R_4$ substituents in the formula

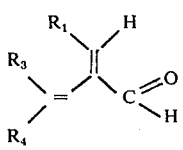

is similarly significant.
The 2-ethylidene-cis-3-hexenal,

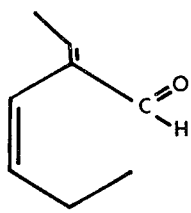

has a citrus, albedo-like character which ideally suits it for use in citrus flavors and particularly orange. In orange drink it imparts a juice-like character and improves the sweetness. 2-Ethylidene-6-methyl-cis-3-heptenal:

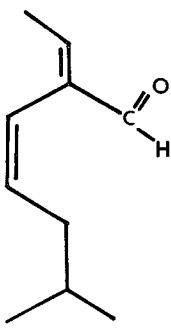

has a green, floral, slightly cucumber top fragrance note with a twig-like undertone particularly suiting it for use in fragrance compositions.

The 2-alkylidene-3-alkenal derivatives and mixtures thereof according to the present invention can be used to alter, vary, fortify, modify, enhance, or otherwise improve the organoleptic properties, including flavor and/or aroma, of a wide variety of materials which are ingested, consumed, or otherwise improve the organoleptic properties, including flavor and/or aroma, of a wide variety of materials, which are ingested, consumed, or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

The starting material utilized herein is an α, β-unsaturated aldehyde having the formula:

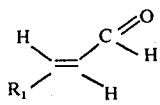

wherein $R_1$ has the significance stated above. This aldehyde is reacted with a halogen either under anhydrous conditions, or in the presence of water. The halogens which can be used include chlorine, bromine and iodine, with chlorine and bromine being preferred.

The halogen can be added by any convenient method, depending upon its physical state. Thus, chlorine in the gaseous state can be bubbled into an aqueous solution or dispersion of the aldehyde. Bromine can be added in the form of a liquid, the addition preferably being a relatively slow one; for instance, it can be added drop-by-drop.

The initial addition can take place at a relatively low temperature, depending upon the particular halogen, so as to moderate and control the rate of reaction. Thereafter, the temperature is gradually raised to the range of from about 70°C to about 100°C to insure good completeness of reaction. In some embodiments of the invention, it is preferred to heat the aqueous mixture to reflux temperature. The reaction times required will vary with the halogen utilized, its mode of addition, the temperature, the particular reactant, and the reaction vehicle. It is generally preferred to conduct this reaction over from about 1 to about 10 hours.

The resulting halo derivative has the formula:

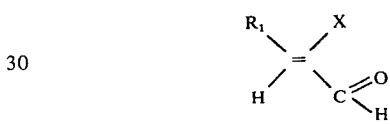

wherein X represents a halo atom such as bromo or chloro. The halo derivative can be purified and isolated, if desired as disclosed herein.

This halo derivative is then utilized to prepare the alkylidene alkene halide having the formula:

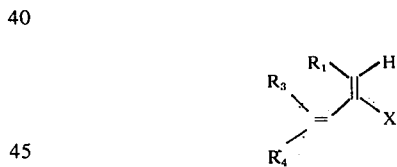

wherein $R_1$, $R_3$, $R_4$ and X have the significance stated above. This halide derivative can be obtained either (i) by an alkenylation reaction with a suitable alkenylating agent such as a tri-substituted alkylidene phosphorane or an alkylidene phosphorous triamid or (ii) by using an alkylating agent such as an alkyl magnesium halide Grignard reagent followed by hydrolysis to form a hydroxyhaloalkene having the structure:

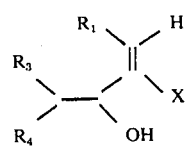

and subsequent dehydration of the hydroxyhaloalkene. Where the halide derivative is obtained by use of the alkenylation reaction, i.e., step (i) a mixture of alkylidene cis alkene halide and alkylidene trans alkene halide are obtained. However, the ratio of cis to trans isomers in this step can be predetermined depending upon the solvent utilized. Thus, for example, where a trisubstituted ethylidene phosphorane is used in a hexane solvent, the ratio of cis isomer to trans isomer is 7:3. On the other hand, when the alkenylation reaction is carried out by starting with the alkyl magnesium halide Grignard reagent, the alkylidene alkene halide formed after the dehydration reaction is substantially all alkylidene trans alkene halide. In the foregoing statement the terms "cis" and "trans" are used with reference to $R_3$ or $R_4$ is alkyl on the one side of the double bond and the ethylidene moiety on the other side of the double bond.

The Grignard route utilizes a compound having the formula:

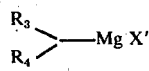

wherein X' represents bromo or chloro and $R_3$ and $R_4$ are defined as above. The reaction with the Grignard reagent is carried out in a reaction vehicle such as a solvent for the halo compound.

Such vehicles include aliphatic or cyclic ether compounds such as diethyl ether, tetrahydrofuran, "Glyme" ethylene glycol dimethyl ether, "Diglyme" diethylene glycol dimethyl ether, and the like. The temperatures utilized can range from −10°C up to about 100°C. Temperatures on the order of 15°–30°C are preferred.

The time for reaction at such temperatures can range from 10 minutes to about 2 hours. The time is dependent upon the temperature, vehicle, particular reactants, and the rate at which the reacting materials are combined.

The initial reaction with the Grignard reagent forms a compound having the structure:

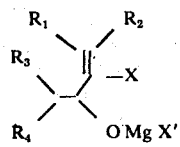

On hydrolysis with a dilute mineral acid such as dilute hydrochloric acid or dilute sulfuric acid or with an acid salt such as ammonium chloride the corresponding hydroxyl compound is formed. This resulting hydroxyl derivative is then dehydrated to the alkene halide by treatment at relatively high temperatures with a strong dehydrating agent such as an alkali metal bisulfate or oxides such as alumina, silica, and the like. The bisulfate dehydration is carried out with an alkali metal salt such as sodium or potassium bisulfate. Potassium bisulfate is a preferred bisulfate.

The bisulfate dehydration reaction is carried out as a fusion with temperatures on the order of from about 200°C to about 250°C, and temperatures of 210°–225°C are preferred.

The dehydration can also be carried out by passing the hydroxy compound over an oxide at temperatures of from about 200°C to about 400°C. Preferred oxides include silica, alumina, and the like. In either event, the product obtained is the 1-alkylidene-1-halo-2-alkene.

The alternative route to the alkylidene haloalkene (wherein the mixture of cis and trans isomers is formed however) is by way of a phosphorous compound. The phosphorous compounds utilized herein are either aliphatic alkylidene trialkyl or triaryl-substituted phosphoranes having the formula:

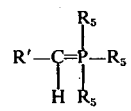

wherein $R_5$ is aryl, preferably phenyl, or alkyl, preferably lower alkyl containing from two to four carbon atoms, and R' is the alkyl group represented by $R_3$ or $R_4$ or an alkylidene phosphorous triamide having the formula:

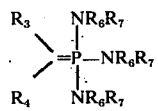

wherein $R_3$ and $R_4$ is defined above and $R_6$ and $R_7$ when taken alone are alkyl or when taken together are alkylidene.

The reaction of the α-halo aldehyde and the phosphorous compound is desirably carried out in the presence of a reaction vehicle which serves to modify and control the course of the reaction. Preferred vehicles include aliphatic or cyclic ethers or alicyclic, acyclic and aromatic hydrocarbons having from 5 up to 10 carbon atoms. Thus, preferred solvents include diethyl ether, tetrahydrofuran, benzene, toluene, hexane and the like. The reaction is desirably carried out at temperatures between −10°C and 100°C. In certain particularly preferred embodiments of the invention, temperatures of from about 20°C to about 30°C are utilized. The solvent used will determine the cis-trans isomer ratio. Thus, use of a hexane solvent gives rise to a cis-trans isomer mole ratio of 7:3.

Regardless of which alkenylation route is used, the intermediate produced is always a 1-alkylidene-1-halo-2-alkene having the structure:

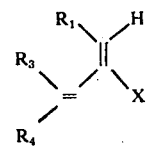

This alkylidene halo alkene is converted to the 2-alkylidene-3-alkenal by means of one of two reaction sequences:

1. The 1-alkylidene-1-halo-2-alkene is reacted with magnesium to form a Grignard reagent having the structure:

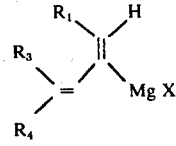

This Grignard reagent is then reacted with a trialkyl orthoformate (thus forming an acetal which is then hydrolyzed in acid) thus forming 2-alkylidene-trans-3-alkenal only.

2. The 1-alkylidene-1-halo-alkene is reacted with an alkyl alkali metal compound such as n-butyl lithium thereby forming the 1-alkylidene-1-lithio-2-alkene having the structure:

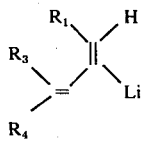

The thus formed 1-alkylidene-1-lithio-2-alkene is then reacted with a di-lower alkyl formamide (followed by acid hydrolysis) such as dimethyl formamide. Prior to the reaction with the n-butyl lithium, or the like, the 1-alkylidene-1-halo-2-cis-alkene and 1-alkylidene-1-halo-2-trans-alkene may be separated as by distillation. If the cis and trans isomers are so separated then the resulting product will be separately 2-alkylidene-cis-3-alkenal and 2-alkylidene-trans-3-alkenal. On the other hand if the cis and trans isomers are not so separated then the resulting product would be a mixture of 2-alkylidene-cis-3-alkenal and 2-alkylidene-trans-3-alkenal.

In reaction sequence (1) the alkadienyl magnesium halide is prepared by adding metallic magnesium to the reaction medium in an amount which is desirably at least equimolar to the alkylidene haloalkene. The treatment with magnesium is carried out at temperatures in the range of from about 20° up to 100°C, and preferably from 35° to 80°C. The reaction is carried out in an inert reaction vehicle and aliphatic or cyclic ethers are desirable. Examples of such preferred vehicles are tetrahydrofuran, "Glyme," "Diglyme" and the like.

Also, in reaction sequence (1) the reaction with the trilower alkyl orthoformate is carried out at reflux conditions in, preferably, the same solvent that was used in the original Grignard reaction. Thus, if the original Grignard reaction used tetrahydrofuran has a solvent, the reaction of the Grignard reagent with the tri-lower alkyl orthoformate (thus forming an acetal which is then hydrolyzed in acid) is also conveniently carried out in the same solvent; tetrahydrofuran. The orthoformates used are desirably lower alkyl orthoformates wherein the alkyl groups came from 1 up to about 4 carbon atoms. A preferred orthoformate is ethyl orthoformate (triethoxy methane). In this reaction sequence (1) only the 2-alkylidene-trans-3-alkenal is obtained.

In reaction sequence (2) the 1-alkylidene-1-lithio-2-alkene is prepared by adding an alkyl alkali metal compound such as n-butyl lithium to the 1-alkylidene-1-halo-2-alkene. Optionally, prior to such addition, the cis and trans isomers, the 1-alkylidene-1-halo-trans-2-alkene and the 1-alkylidene-1-halo-cis-2-alkene may be separated as by means of distillation. The alkali metal which can be used in the alkyl alkali metal compound may be either lithium, sodium of potassium, with lithium being the preferred alkali metal. The alkyl group is desirably one containing from 3 to 6 carbon atoms such as the n-butyl group. Thus, n-butyl lithium is a preferred agent for converting the alkylidene halo alkene to the 1-alkylidene-1-lithio-2-alkene. In forming the 1-alkylidene-1-lithio-2-alkene the following solvents may be used: diethyl ether, tetrahydrofuran, "Glyme" and "Diglymet" as well as other aliphatic or cyclic ethers. The reaction is carried out at temperatures in the range of from about −30°C up to +50° C with the range −15°C up to 0°C being preferred. The reaction of 1-alkylidene-1-lithio-2-alkene with the di-lower alkyl formamide is carried out in the same solvent at temperatures in the range of from −5°C up to +15°C with the range of 0°C up to 10°C being preferred. As stated above, if the cis and trans isomers of the 1-alkylidene-1-halo-2-alkene are not separated in this reaction sequence (2) then the resulting product, the 2-alkylidene-3-alkenals will be in the form of a mixture of cis and trans isomers.

The pressure in each step of the reaction sequences (1) and (2) can vary over a range of from sub-atmospheric to super-atmospheric. It is generally preferred for reasons of convenience and economy to carry out the reaction at substantially atmospheric pressure.

The intermediate and/or final products obtained can be purified or isolated by conventional purification after appropriate washing, neutralizing and/or drying as appropriate. Thus, such products can be purified and/or isolated by distillation, steam distillation, vacuum distillation, extraction, crystallization, preparative chromatographic techniques, and the like.

It will be understood from the present description that compounds prepared according to the present disclosure can be utilized to alter the organoleptic properties of a wide variety of consumable materials. These materials include foods, perfumes, odorants, and tobacco products. The compounds prepared according to the process can be added directly to the consumable materials or they can be added in the form of flavoring compositions or perfume compositions, depending upon the consumable material involved. The compounds can be added at a stage of preparation of the consumable material to provide optimum results, based upon equipment used, process techniques, ultimate use, and the like.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of α-Chlorocrotonaldehyde

A one-liter, three-neck round bottom flask equipped with reflux condenser, mechanical stirrer, thermometer, Y-tube and chlorine inlet tube is charged with 300 ml of water and 70 g of anhydrous crotonaldehyde. The contents are cooled to 8°C and 82 grams of chlorine is bubbled in over a period of three hours, maintaining the reaction temperature between 7°C and 11°C. The reaction mass is then heated to reflux for a period of 2 hours (99°–100°C). The reaction mass at this point is two-phase: an oil phase and an aqueous phase.

The aqueous phase is extracted with two 100 ml portions of chloroform. The chloroform extract is combined with the organic phase and the combined material is filtered through 5 g of anhydrous sodium sulfate. The filtrate is dried over 15 g of anhydrous sodium sulfate and washed with 30 ml of chloroform. The chloroform is evaporated to yield 104 grams of crude material which is distilled through a 30 cm Vigreux column at 141°–147°C vapor temperature and atmospheric pressure to give α-chlorocrotonaldehyde in 74.5% yield. (A known process).

EXAMPLE II

Preparation of cis and trans 3-Chloro-4-hydroxy-2-heptene

A 500 ml three-neck reaction flask equipped with reflux condenser, mechanical stirrer, calcium chloride drying tube, thermometer, additional funnel and Y-tube is charged with 9.6 g magnesium turnings and 30 ml anhydrous diethyl ether. Three drops of a solution of 50 g of 2-bromopropane in 100 ml of diethyl ether is added with stirring to the magnesium-diethyl ether mixture. When the reaction has started, as evidenced by a temperature rise, the rest of the 2-bromopropane ether mixture is added at a rate which maintains refluxing.

After addition is complete the reaction mass is stirred for a period of one hour at room temperature, at the end of which period the magnesium turnings are completely consumed. A solution of 32 g of α-chlorocrotonaldehyde in 70 ml of diethyl ether is added dropwise to the flask at a rate which maintains gentle reflux. The reaction mass is stirred for 1 hour at room temperature and then cooled to 5°C using an ice water bath.

A saturated ammonium chloride solution (100 ml) is added dropwise to the reaction mass with stirring while maintaining the pot temperature just below 25°C. After decanting the organic phase from the resulting thick precipitate, a solution of 110 ml of 10 percent aqueous sulfuric acid is added to the precipitate. The resulting aqueous solution is extracted using two 100 ml portions of diethyl ether and the extracts are added to the original organic solution. After drying the diethyl ether solution over 35 grams of anhydrous sodium sulfate, the solution is concentrated in vacuo on a rotary evaporator to provide 32.7 g of a yellow liquid.

The liquid is distilled in vacuo through a semi-micro Vigreux column equipped with a variable reflux head. The product having a structure confirmed by MS (mass spectroscopy), IR (infrared) and NMR (nuclear magnetic resonance) analyses is 3-chloro-4-hydroxy-2-heptene distilling at 72°–75°C and 8 mm Hg pressure.

EXAMPLE III

Preparation of 3-Chloro-2,4-heptadiene from 3-Chloro-4-hydroxy-2-heptene

A 25 ml three-neck semi-micro reaction flask equipped with distillation head, receiver and oil bath is charged with 3.0 g of fused potassium bisulfate. The potassium bisulfate is melted by heating the oil bath to 220°C and 5.5 g of the 3-chloro-4-hydroxy-2-heptene produced according to Example II is added dropwise over 15 minutes.

During the addition, the product distills from the reaction mixture. Redistillation gives two isomers of 3-chloro-2,4-heptadiene boiling at 140°–143°C at atmospheric pressure. NMR, MS and IR data confirm that the structure of the resulting compound is 3-chloro-2,4-heptadiene. They are presumed to be the cis and trans isomers of 3-chloro-2,4-heptadiene.

EXAMPLE IV

Preparation of cis and trans 3-Chloro-2,4-heptadiene from α Chlorocrotonaldehyde A two-liter round bottom three-neck flask with additional funnel, mechanical stirrer, pot thermometer, nitrogen inlet, and Vigreux column with calcium chloride drying tube is charged with 1000 ml of anhydrous diethyl ether and 82.5 g of triphenyl phosphine salt of 1-bromopropane, and 85 ml 2.43 molar solution of methyl lithium in ether is added during 12 minutes while maintaining a temperature between 14° and 18°C. When addition is complete 900 ml of ether is removed by distillation, and the addition of a solution of 21.7 g of α-chlorocrotonaldehyde in 200 ml of ether is started. The addition results in a thick slurry which is made more fluid by the addition of an additional 200 ml ether.

After heating at reflux for 4 hours the reaction mixture is cooled and the solid material removed by filtration. Concentration of the filtrate gives 9 grams of a semi-solid material which, after trituration with two 200 ml portions of pentane and subsequent solvent removal gives 3.3 g of crude cis and trans 3-chloro-2-heptadiene.

EXAMPLE V

Preparation of 2-Ethylidene-trans-3-hexenal Using the Grignard Reagent of 3-Chloro-2-Cis-4-Heptadiene and 3-Chloro-2-Trans-4-Heptadiene A 25 ml three-neck round bottom flask equipped with a thermometer, reflux condenser, magnetic stirrer, and calcium chloride drying tube is charged with 0.5 ml anhydrous tetrahydrofuran, 0.41 g of magnesium turnings and two drops of ethylene bromide. After 30 minutes, three drops of 3-chloro-2,4-heptadiene is added to the reaction mass. In approximately 1 hour the reaction mass is heated to reflux.

After an additional one-half hour, 1.5 g of 3-chloro-2,4-heptadiene is added and the reaction mass refluxed for a period of 5 hours, during which time 2 drops of ethylene bromide is added.

At the end of the 5 hour period, 1.71 g of ethyl orthoformate is added, while maintaining the temperature of the reaction mass between 60° and 70°C. The reaction mass is then refluxed for 20 minutes and cooled overnight. The pH of the mixture is adjusted to one by adding 3.2 g of 6 percent aqueous hydrochloric acid.

The reaction mass separates into two phases, an aqueous phase and an oil phase. The aqueous phase is extracted with two 3 ml portions of ether. The ether extracts are combined with the oil layer and the resulting material washed successively with 0.5 ml saturated aqueous sodium chloride, 0.5 ml saturated aqueous sodium bicarbonate, and 0.5 ml saturated aqueous sodium chloride. The washed ether solution is filtered through anhydrous sodium sulfate and concentrated on a rotary evaporator yielding 1.2 grams of material. 2-Ethylidene-trans-3-hexenal is isolated by preparative GLC (5 percent Carbowax 20 M polyoxyethylene glycol on Chromasorb G alumina, 8 feet × ¼ inch column).

IR, NMR and MS analyses confirm the structure as 2-ethylidene-trans-3-hexenal.

EXAMPLE VI

Preparation of α-Bromocrotonaldehyde

A 1000 ml round bottom three-neck flask equipped with Y-tube, calcium chloride drying tube, pot thermometer, additional funnel, and mechanical stirrer is charged with 100 g of crotonaldehyde, and 220 g of bromine is added over a period of 1½ hours while maintaining the temperature of the contents of the flask at between −10°C and −2°C. One hundred and forty-two grams of finely powdered sodium acetate is added to the reaction mass over 20 minutes, and the mass is then stirred while maintaining the pot temperature at between 15°C and 30°C. The reaction mass is then steam-distilled for 40 minutes using a Friedrich condenser and a three-neck 250 ml receiving flask to obtain 147.2 g of a yellow oil.

The oil is washed with four 25 ml portions of saturated aqueous sodium bicarbonate and then dried over anhydrous potassium chloride. The resulting material is distilled on a 30 cm Vigreux column at a temperature of 75°–76°C and 30 mm Hg to provide α-bromocrotonaldehyde.

EXAMPLE VII

Preparation of Mixture of
3-Bromo-2-Cis-4-Heptadiene and
3-Bromo-2-Trans-4-Heptadiene A 3000 ml round botton three-neck flask equipped with a mechanical stirrer, pot thermometer, nitrogen inlet tube, and addition funnel is charged with 1100 ml of anhydrous benzene and 180 g of triphenylphosphine salt of 1-bromopropane, and 205 ml of (2.34 M) solution of butyl lithium in hexane is added over 1 hour while keeping the reaction mass under a nitrogen blanket. A deep red orange slurry is obtained. A solution of 65 g of α-bromocrotonaldehyde in 100 ml of anhydrous benzene is added to the reaction mass during one hour to yield a white tan solution.

The reaction mass is then warmed to 50°C with stirring and maintained at 50°–55°C for a period of 1 hour. The reaction mass is filtered yielding a benzene solution and a white precipitate, which precipitate is washed with an additional 100 ml of benzene. The benzene solution and the benzene wash are combined, the benzene is evaporated, and the resulting 85.3 g of oil is chromatographed through a 5 × 80 cm column packed with aluminum oxide. The 80 g of chromatographed oil is distilled at 74°–78.5°C (35–38 mm Hg pressure) to give a 57 percent yield of 3-bromo-2-cis-4-heptadiene and 3-bromo-2-trans-4-hepadiene (cis:-trans ratio, 7:3) the structures of which are confirmed by NMR, IR and MS analyses.

EXAMPLE VIII

Preparation of 2-Ethylidene-trans-3-hexenal from
3-Bromo-2-Cis-4-Heptadiene

A 50 ml three-neck round bottom flask flushed with nitrogen and equipped with a reflux condenser fitted with a calcium chloride drying tube, a magnetic stirrer, a pot thermometer and a nitrogen inlet tube is charged with 1.04 g of magnesium turnings and 8 ml of tetrahydrofuran, and 0.2 cc of 3-bromo-2-cis-4-heptadiene is then added to initiate the reaction, while maintaining the reaction mass at a temperature of 42°–45°C. Additional tetrahydrofuran (2 ml) is added to the reaction mass. A solution of 3.2 g of 3-bromo-2,4-heptadiene in 5 ml of dry tetrahydrofuran is then added to the reaction mass during 1 hour while maintaining the reaction mass of 40°–45°C.

After 2 hours 4.67 g of ethyl orthoformate is added to the reaction mass over a 25 minute period, while maintaining the pot temperature between 37° and 48°C. The reaction mass is then heated to reflux and maintained at reflux for 45 minutes. The reaction mass is then cooled and a dark amber solution decanted from the unreacted magnesium. Tetrahydrofuran is evaporated from the solution to yield 11.9 g of a viscous amber oil. Six percent aqueous hydrochloric acid (14.4 g) is added to the oil and two phases form.

After separation the aqueous phase is washed with two 5 cc portions of ether which are combined with the organic layer. The combined organic layer is washed successively with 1.5 ml saturated aqueous sodium bicarbonate and 1.5 ml saturated aqueous sodium chloride, dried over anhyrous sodium sulfate, and concentrated to give 1.5 g of an amber oil. Preparative GLC using a 5% Carbowax column and Chromosorb G (SE-30 column - 100°, 4°/min.) yield cis-2-ethylidene-trans-3-hexenal, the structure of which is confirmed by MS, GLC and NMR analyses.

EXAMPLE IX

Preparation of 2-Ethylidene-cis-3-hexenal from
3-Bromo-2-Cis-4-Heptadiene

A 100 ml three-neck round bottom flask equipped with magnetic stirrer, thermometer, calcium chloride drying tube, and nitrogen inlet tube is charged with a solution 2.0 g of 3-bromo-2-cis-4-heptadiene in 20 ml of anhydrous diethyl ether, and 5.4 ml of n-butyl lithium (2.34 M in hexane) is then added while maintaining the pot temperature at −10°C during 2 minutes. The reaction mass is then stirred for a period of three hours to provide a clear yellow solution.

The reaction mass is then added to a second dry 100 ml round bottom three-neck flask containing 1.25 grams of dimethyl formamide and 20 ml of anhydrous ether. The clear yellow solution becomes turbid and a white solid precipitates. The temperature range during the 2 minute addition is 0°C to 9°C.

The reaction mass is then stirred and warmed to room temperature over a period of ½ hour, and 30 ml of 0.5 N aqueous hydrochloric acid is added to dissolve the precipitate. The reaction mass separates into two layers, an ether layer and an aqueous layer. After separation the ether layer is washed with 5 ml saturated aqueous sodium bicarbonate, dried over anhydrous sodium sulfate, and concentrated to obtain 1.4 g of a yellow oil.

Preparative GLC separation on a 8 feet × ½ inch 5 percent Carbowax (SE-30 column, 100°, 4°/min.) yields 2-ethylidene-cis-3-hexenal, the structure of which is confirmed by NMR, IR and MS analyses. The material is distilled at 27°–33°C and 4–5.8 mm Hg pressure.

EXAMPLE X

2-Ethylidene-trans-3-hexenal from
3-Bromo-2-trans-4-Heptadiene

A 250 ml three-neck flask fitted with addition funnel thermometer calcium chloride drying tube and magnetic stirrer is charged with 5.45 g of 3-bromo-2,4-heptadiene (4-cis/4-trans ratio 15 to 85) and 55 ml of ether. The reaction mass is cooled to −15° and 14.6 ml of a 2.34 molar solution of butyl lithium in hexane is added during 30 minutes. The reaction mixture is allowed to stand for 5 hours at +3° to −5°C.

The reaction mixture is transferred to a flask containing 3.41 g of dimethyl formamide in 40 ml of ether previously cooled to −10°C. After standing 20 minutes, 35 ml of 4 percent aqueous hydrochloric acid is added to give two phases. The aqueous layer is diluted to 75 ml with water and extracted with 20 ml of ether. The ether extract and organic phase are combined, washed with saturated sodium bicarbonate solution (10 ml), and dried with sodium sulfate.

Removal of the ether provides 4.9 g of oil. Column chromatography on 98 g of silicic acid with hexane/hexane: ether provides 0.16 g of 2-ethylidene-trans-3-hexenal. MS, NMR and IR analyses confirm the structure.

EXAMPLE XI

Separation of 3-Bromo-2-Cis and Trans-4-Heptadiene

A mixture of 3-bromo-2-cis and trans-4-heptadiene is distilled through a 2.5 × 15 cm column packed with ¼ inch Raschig rings to give 23.7 g of material which by GLC is 67 percent cis and 31 percent 3-bromo-2-trans-4-heptadiene boiling between 75°C and 78°C at 38 torr and 2.4 g of material which by GLC is 15 percent cis and 85 percent 3-bromo-2-trans-4-heptadiene.

What is claimed is:

1. A process for the preparation of an alkylidene trans alkene halide having the structure:

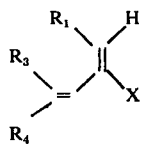

wherein $R_1$ is lower alkyl, $R_3$ is hydrogen and $R_4$ is lower alkyl; comprising the steps of:

a. Reacting a halo-alkenal of the formula:

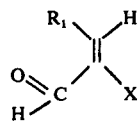

wherein $R_1$ is lower alkyl and X is chloro, bromo or iodo with a Grignard reagent of the formula:

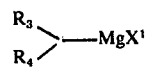

wherein $R_3$ is lower alkyl and $R_4$ is hydrogen and $X^1$ is bromo or chloro in order to provide an organometallic compound having the formula:

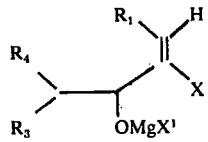

b. Hydrolyzing said organometallic compound with a hydrolyzing agent selected from the group consisting of dilute mineral acids and acid salts thereby forming a hydroxyalkene having the structure:

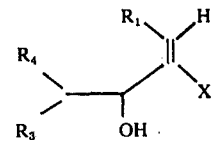

c. Reacting said hydroxyalkene with a dehydrating reagent which is an inorganic oxide, at a temperature of from 200°C up to 400°C, said inorganic oxide being selected from the group consisting of alimina and silica, thereby providing the corresponding alkylidene alkene halide having the structure:

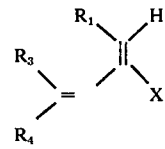

2. A process for the preparation of a trans-2-alkylidene-3-alkene halide having the structure:

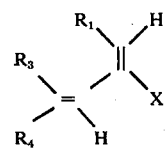

wherein $R_1$ is lower alkyl, $R_3$ is hydrogen and $R_4$ is lower alkyl; comprising the steps of:

a. Reacting a halo-alkenal of the formula:

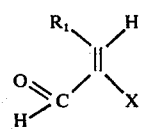

wherein $R_1$ is lower alkyl and X is chloro, bromo or iodo with a Grignard reagent of the formula:

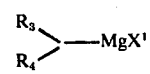

wherein $R_3$ is lower alkyl and $R_4$ is hydrogen and $X^1$ is bromo or chloro in order to provide an organometallic compound having the formula:

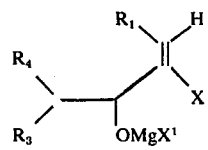

b. Hydrolyzing said organometallic compound with a hydrolyzing agent selected from the group consisting of dilute mineral acids and acid salts thereby forming a hydroxyalkene having the structure:

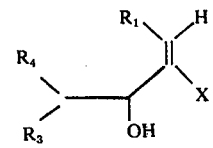

c. Reacting said hydroxyalkene with a dehydrating agent which is an alkali metal bisulfate at a temperature of from 200°C up to 250°C, thereby providing the corresponding alkylidene alkene halide having the structure:
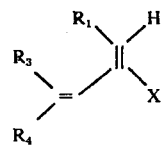
* * * * *